United States Patent [19]

McKee

[11] 4,169,559

[45] Oct. 2, 1979

[54] DISTRIBUTOR FOR PARTICULATE MATERIAL

[75] Inventor: Walter L. McKee, Cedar Rapids, Iowa

[73] Assignee: Henderson Mfg. Co., Cedar Rapids, Iowa

[21] Appl. No.: 874,486

[22] Filed: Feb. 2, 1978

[51] Int. Cl.$^2$ ............................................. A01C 19/00
[52] U.S. Cl. ..................................... 239/672; 239/687
[58] Field of Search ............... 239/650, 657, 672–678, 239/681, 682, 693, 687; 222/609, 610, 538

[56] References Cited

U.S. PATENT DOCUMENTS

| | | | |
|---|---|---|---|
| 2,003,628 | 6/1935 | Chadwick | 239/657 |
| 2,327,266 | 8/1943 | Hoffstetter | 239/683 X |
| 3,559,894 | 2/1971 | Murray | 239/672 |
| 3,790,090 | 2/1974 | Lorenc et al. | 239/676 X |
| 3,819,120 | 6/1974 | Walker | 239/661 |

FOREIGN PATENT DOCUMENTS 1109057  4/1968  United Kingdom ..................... 239/650

Primary Examiner—John J. Love
Attorney, Agent, or Firm—Rudolph L. Lowell; G. Brian Pingel

[57] ABSTRACT

A distributor for a particulate material is mountable on a portable container having a rear discharge chute, and includes a hopper for receiving material from the discharge chute, and spreader means mounted below the hopper for spreading the material. The distributor further includes means for pivotally securing the hopper to the discharge chute, so that the hopper and spreader are movable as a unit between an operating position, in which the hopper and spreader depend from the discharge chute, and an elevated storage position, in which the hopper and spreader are located above the base of the container. A winch and cable assembly moves the hopper and spreader between the operating position and the storage position.

5 Claims, 6 Drawing Figures

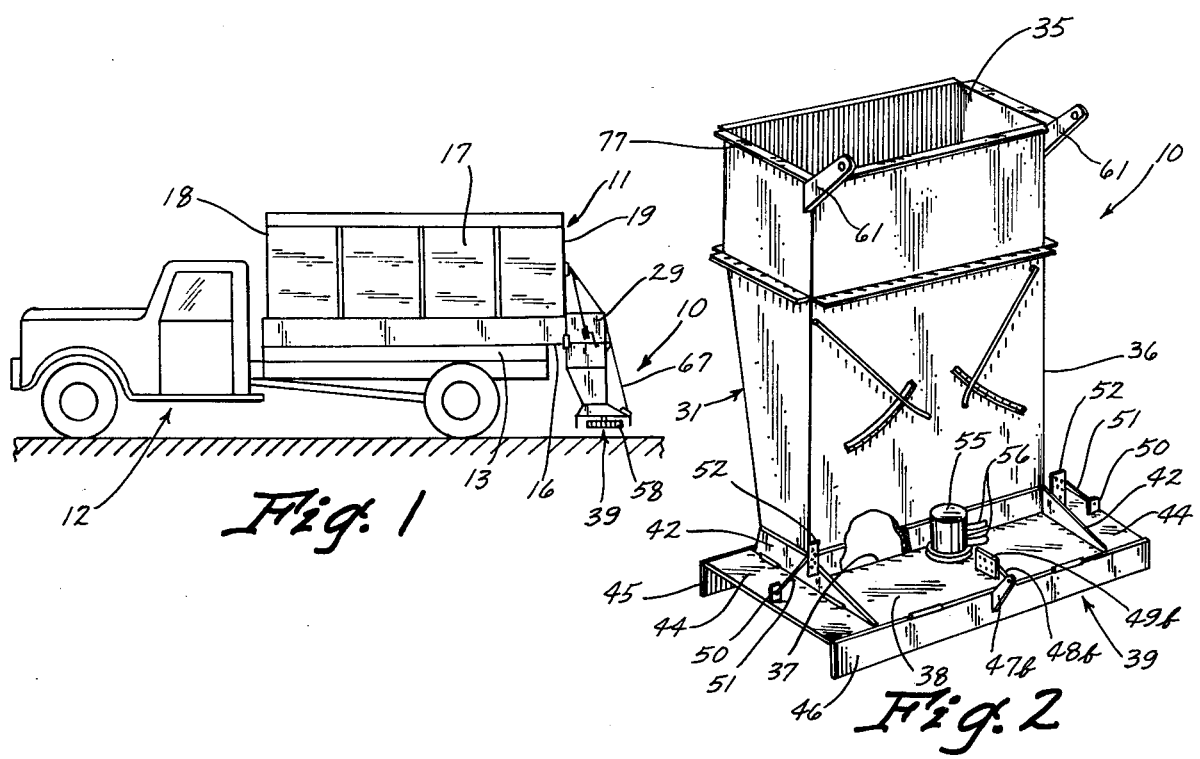
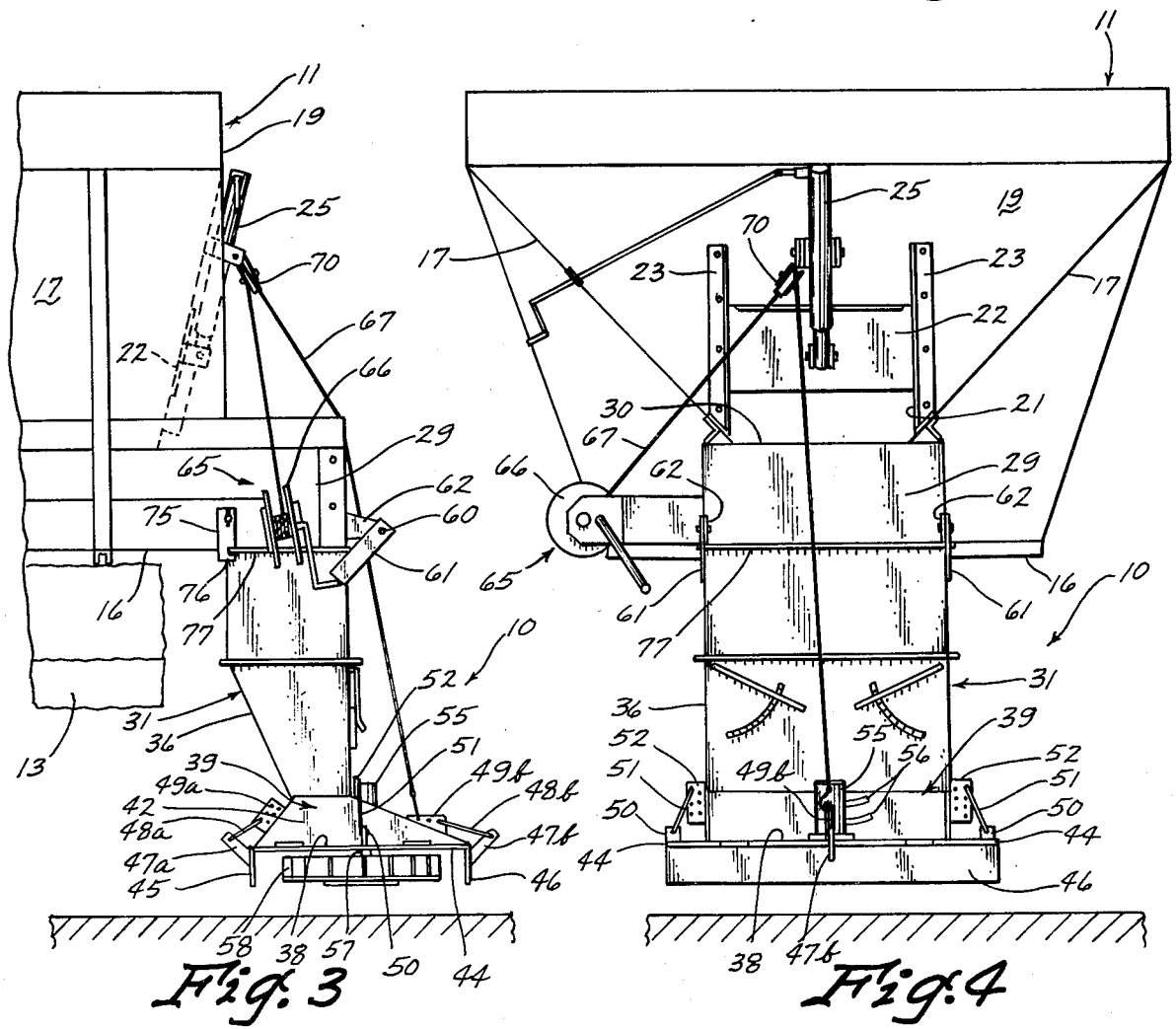

DISTRIBUTOR FOR PARTICULATE MATERIAL

BACKGROUND OF THE INVENTION

1. Field of the Invention

The present invention relates in general to distributors for spreading particulate material from a portable container, and more specifically relates to distributors that are movable with respect to the containers with which they are associated.

2. Description of the Prior Art

A wide variety of distributors for spreading particulate material from a container are known in the art. Such distributors have been found to be particularly advantageous for use with containers that are mountable on the body of a truck used by highway maintenance departments in spreading salt, sand, or gravel on the surface of roads that are covered by ice, or snow. To provide a defined spreading pattern that is restricted to the roadway and is sufficiently unaffected by high winds, known distributors include spreading means that are positioned below the axles of the trucks on which they are mounted. Such spreader means are exposed to road hazards and to the risk of being damaged as the trucks travel over rough terrain.

In a U.S. Pat. to Walker, No. 3,819,120, a distributor mountable by a support frame to the rear end of a truck is vertically movable with respect to the frame. However, such movement is for the sole purpose of controlling the spreading pattern of the distributor.

SUMMARY OF THE INVENTION

The present invention provides an improved particulate material distributor that is pivotally mounted from the rear discharge chute of a portable container and includes a hopper for receiving particulate material from the discharge chute and spreader means mounted on the lower end of the hopper. The distributor is movable between a lowered operating position, in which the hopper and spreader means extend downwardly below the discharge chute, and an elevated storage position, in which the distributor projects upwardly from the discharge chute.

In a preferred embodiment the material container, on which the distributor is mounted, is carried in a truck body and the spreader means of the distributor is driven by a rotary hydraulic motor associated with the hydraulic fluid system of the truck. A manually operated winch and cable assembly mounted on the container includes a cable attached at one end to the distributor for moving the distributor between the operating and storage positions therefor. Such movement is made possible by the support of the hydraulic drive motor directly on the spreading means so that the only drive connections between the truck and the motor are the flexible fluid transmission lines for supplying fluid from the truck hydraulic system to the motor.

DESCRIPTION OF THE DRAWINGS

FIG. 1 is a side view of a truck showing the distributor of the present invention mounted from a discharge chute at the rear end of a material container carried on the truck;

FIG. 2 is an enlarged rear perspective view of the distributor shown in FIG. 1;

FIG. 3 is a side view of the rear portion of the truck and container showing the distributor in the lowered operating position therefor;

FIG. 4 is a rear view of the distributor and container assembly shown in FIG. 3;

DESCRIPTION OF PREFERRED EMBODIMENT

Figure 5:
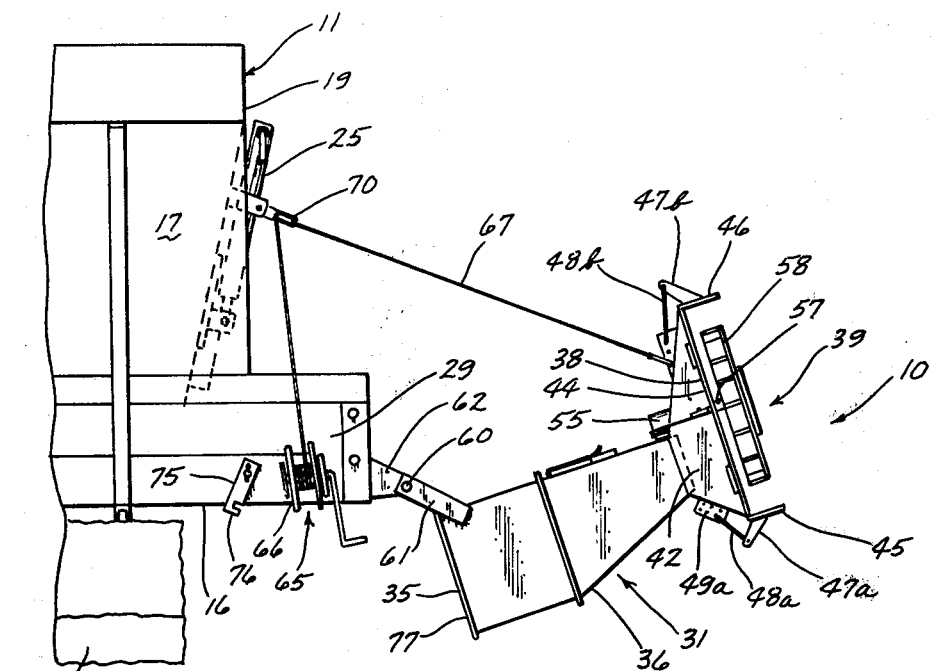
FIG. 5 is illustrated similarly to FIG. 3 and shows the distributor in an intermediate moved position.

A preferred embodiment of the distributor of the present invention, indicated generally at 10 in FIG. 1, is adapted for spreading salt, sand and other particulate material from the rear of a container 11. A usual truck 12, such as that used by state highway maintenance departments, has a body 13 for receiving the container 11. The container 11 is of a flare type and includes a base or bottom wall 16, a pair of sidewalls 17, a front wall 18 and a rearwall 19. Referring to FIG. 4, the rear container wall 19 has a lower central opening 21 adjacent the base 16 closeable by a gate 22 guidable for vertical movement in tracks 23 fixed to the rear wall 19. The gate 22 is operated by a cylinder and piston assembly 25 mounted on the rear wall 19. A discharge chute 29 for the container 11 projects rearwardly from the rear wall 19, and has an upper opening 30 for receiving material from the container opening 21.

As shown in FIG. 3, the distributor 10 is mounted on the discharge chute 29 and includes a hopper 31 of a generally rectangular shape in transverse section having a top opening 35 (FIG. 2). The hopper 31 has a lower tapered portion 36 which terminates in a relative narrow opening 37 formed in a top plate 38 of a rotary spreader 39 secured to the lower hopper portion 36. The assembly of the hopper 31 and spreader 39 forms the distributor 10.

The top plate 38 of the spreader 29 is of a generally square shape having depending adjustable side plates 44 and front and back plates 45 and 46, respectively, pivotally connected to the top plate 38. Extension arms 47a (only one of which is shown in FIG. 3) extend from the front plate 45 and are connected by links 48a to adjustment members 49a secured to side braces 42. An extension arm 47b projects outwardly from the rear plate 46 and is connected by a link 48b to an adjustment member 49b fixed on the top plate 38. Each of the side plates 44 has a leg 50 connected by a link 51 to an adjustment plate 52 secured to the side braces 42. Thus, the side plates 44 and front and back plates 45 and 46, respectively, are manually adjustable between a vertical position, as represented by the position of the plates 45 and 46, and a horizontal position, represented by the side plates 44, to control the spread pattern of the spreader 39.

A rotary hydraulic motor 55, supported on the upper side of the spreader top plate 38, is powered by fluid under pressure supplied from the hydraulic system of the truck 12 via lines 56. An output shaft 57 of the motor 55 extends downwardly through the spreader top plate 38 and mounts a rotary spreader blade 58 for rotation adjacent the under side of the top plate.

Figure 6:
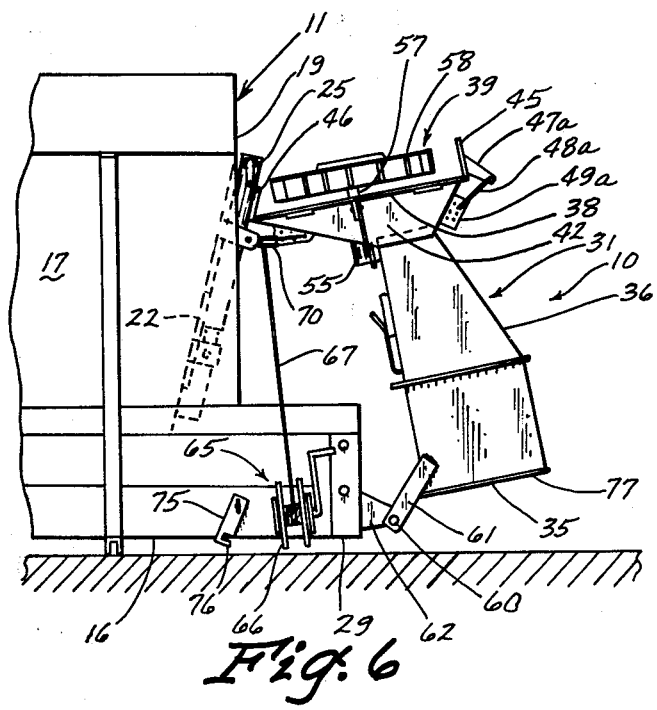
FIG. 6 shows the container removed from the truck with the distributor supported in an elevated storage position.

Referring to FIG. 3, the distributor 10 is pivotally connected to the discharge chute 29 by means including a pair of pivot arms 61 fixed to the rear upper portion of the hopper 31 and pivotally connected at 60 to a pair of pivot arms 62 projected rearwardly from the rear of the chute 29. By virtue of this pivotal connection between the discharge chute 29 and the distributor 10, the distributor 10 is pivotally movable from an operating position projected downwardly from beneath the chute 29 to an elevated inverted position extended upwardly from the rear end of the chute 29, as represented by FIGS. 5 and 6.

On completion of a spreading operation, the distributor 10 may be pivoted to the elevated position therefor for protection against damage in transport. When the container 11 is to be removed from the truck 12 for storage purposes for placement on the ground as shown in FIG. 6, the distributor 10 is moved to the elevated position therefor so as to be located above the ground to permit the entire base of the container to be supported on the ground.

Preferably, a winch and cable assembly 65 is employed for manually moving the distributor 10 from the spreading position to the elevated position therefor. The assembly 65 includes a crank operated winch 66 supported from one side of the discharge chute 29, and a winch cable 67 trained about a pulley 70 on the container 11 for connection to the distributor 10 at the spreader means 39.

In its elevated position, the distributor 10 is held from pivoting downwardly by the winch and cable assembly 65. On release of the winch 66 and unwinding of the cable 67, the distributor 10 is permitted to move downwardly into the operating position therefor wherein the upper end of the hopper 31 is open to the discharge chute 29. To maintain the distributor 10 in its operating position during travel of the truck 12, lock plates 75, pivotally secured at opposite sides of the discharge chute 29 have latch portions 76 engageable with a flange 77 on the upper end of the hopper 31. Thus in both the operating or elevated positions therefor, the distributor 10 is releasably locked against movement.

Although the invention has been described with respect to a preferred embodiment thereof, it is to be understood that it is not to be so limited since changes and modifications can be made therein which are within the full intended scope of this invention as defined by the appended claims.

I claim:

1. A distributor for a particulate material pivotally mounted on a portable container including a rearwardly projected discharge chute having an underside with a discharge opening therein, comprising:
   (a) a hopper with a lower outlet and an upper inlet for receiving particulate material discharged from said discharge opening,
   (b) spreader means mounted on the lower end of said hopper for spreading particulate material discharged from the outlet of said hopper,
   (c) means for pivotally supporting the hopper and spreader means for pivotal movement as a unit from an operating position in which said hopper and spreader means are positioned beneath said discharge opening to an elevated storage position in which said hopper and spreader means are in an inverted position located rearwardly of and above the underside of said discharge chute, and
   (d) means associated with said container for moving said hopper and spreader means between said operating position and said storage position.

2. A distributor according to claim 1 wherein:
   (a) said container is carried on a truck having a hydraulic fluid system, and
   (b) a rotary hydraulic fluid motor mounted on said spreader means and driven by fluid supplied from the hydraulic system fo the truck.

3. A distributor according to claim 2 wherein:
   (a) said spreader means comprises a top plate on which said fluid motor is mounted,
   (b) said fluid motor having an output shaft having an end section projected through said top plate, and
   (c) a spreader blade mounted on said shaft end section.

4. A distributor according to claim 1 wherein:
   (a) said supporting means when the hopper and spreader means are in the operating position therefor, has a first arm mounted on said discharge chute and projected rearwardly therefrom, and a second arm mounted on and extended rearwardly from said hopper, and
   (b) means pivotally connecting the free ends of said first arm and second arm.

5. A distributor according to claim 1 including:
   (a) coacting locking means on said discharge chute and said hopper for releasably locking the hopper and spreader means in said operating position therefor.

* * * * *